Dec. 3, 1935.   G. SCHWEIKERT   2,023,057

WAVE BAND FILTER

Filed July 7, 1931

Inventor:
Gustav Schweikert
By H. B. Willson & Co.
Attorneys

Patented Dec. 3, 1935

2,023,057

UNITED STATES PATENT OFFICE 2,023,057

WAVE-BAND FILTER

Gustav Schweikert, Berlin, Germany

Application July 7, 1931, Serial No. 549,237
In Germany July 1, 1930

24 Claims. (Cl. 178—44)

It is well known to employ, for the purpose of attaining a suitable resonance curve of oscillatory circuits, particularly for broadcasting purposes, wave-band filters with inductive coupling of the separate filter sections, as they have been shown by way of example in Fig. 1 schematically. In contradistinction to simple oscillatory circuits such wave-band filters have, as is known, resonance curves, the maximum of which possesses a certain width, so that resonance oscillations of approximately equal intensity appear in conjunction with a wider frequency band, whilst beyond the resonant range the amplitudes of oscillation drop most abruptly. One such known resonance curve is shown by way of example in Fig. 2. The range of frequencies ($\Delta\omega$) of maximum resonance is determined in connection herewith by the magnitude of the coupling inductance ($L_{12}$ of Fig. 1) and by the existing fundamental frequency ($\omega_0$), to which the separate sections of a filter have been syntonized. When employing such waveband filters, particularly in conjunction with wireless telephony, it is desired to secure a constant width of resonance ($\Delta\omega$) for all frequencies of a given tuning range, because hereby the reception is equal on all points of the wavelengths-scales. It has been proposed to obtain this constancy of resonance by forming the coupling of inductances and a fixed condenser; but this way fails, as in fact with this arrangement the variation of the width of resonance is very considerable with relatively great alterations of the frequency. With this arrangement a variation of the width of resonance may be obtained only by an adjustment of the variable inductances.

I have found that constancy of resonance ($\Delta\omega$) when the oscillating circuit is tuned to all possible fundamental frequencies ($\omega_0$) can be obtained, if the value of the magnitude of the coupling inductances ($L_{12}$) is changed in accordance with certain laws with the modification of the fundamental frequency ($\omega_0$) of the sections of the filter.

Referring to the accompanying drawing, Figure 1 is the general connection-diagram of a filter chain comprising the inductances L, the capacities C and the ohmic loss resistances $r$.

Figure 4:
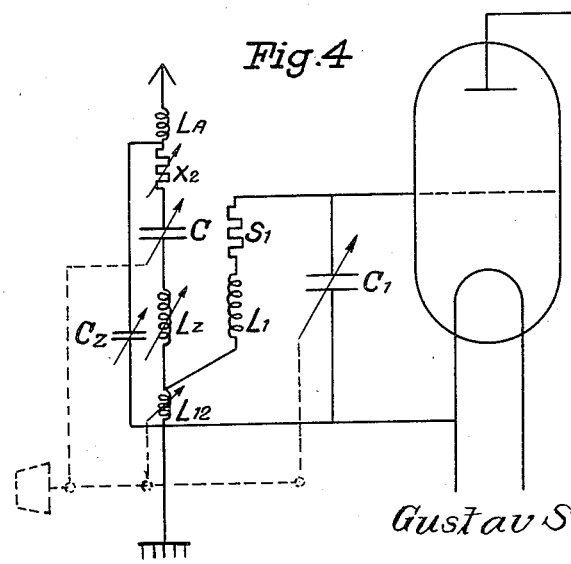

Fig. 4 shows the wiring-scheme of a filter chain embodying the invention in connection with an amplifier valve, the filter chain consisting of the open aerial circuit with the inductances $L_A$ and $L_z$, the capacities C and $C_z$ and the ohmic loss resistance $r_2$ which is coupled by the coupling inductance $L_{12}$ with the closed oscillating circuit comprising the inductance $L_1$, the capacity $C_1$ and the ohmic loss resistance $r_1$.

Attention is directed to the constant self-inductions, preferably equal to each other, of the separate sections $L_1$, the capacities C appertaining thereto, the ohmic resistances $r$ and the range of frequencies of a resonance of approximately equal intensity, when it will be found that in accordance with the invention, in wave-band filters, particularly of constant width of resonance ($\Delta\omega$) for purposes of wireless telephony, the self-induction value $L_{12}$ of the coupling inductivity of the separate sections of the filter represents a value, corresponding accurately or approximately to the following equation:

(1) $\qquad L_{12}=\tau_1\cdot\Delta\omega\cdot L_1^{\frac{3}{2}}\cdot\sqrt{C}+\frac{3}{2}\tau_2\cdot\Delta^2\omega\cdot L_1^2\cdot C.$ The constants $\tau_1$ and $\tau_2$ represent therein certain correction values differing only slightly from unity in numeral value. Their accurate value may be obtained with the aid of the undermentioned formula:

$$\tau_1=1+\frac{1}{2}R+\frac{45}{8}s\left(1+\frac{5}{14}R+\frac{1}{18}R^2\right)+\frac{1}{2}s^{\frac{3}{2}}\cdot$$
$$\left(1+R+\frac{1}{4}R^2\right);\ \tau_2=1+\frac{1}{3}R+3s\cdot\left(1+\frac{1}{3}R\right);$$

whereby it is assumed that:

$$s=\left(\frac{\Delta\omega}{\omega_0}\right)^2;\ R=\left(\frac{\gamma}{\Delta\omega\cdot L_1}\right)^2$$

In regard to the justification and derivation of the preceding and all following formulæ I would refer to my treatise: "Theory and construction of wave-band filters of constant width of resonance", (Theorie und Konstruktion der Siebketten konstanter Resonanzbreite) published in the "Zeitschrift für Fernmeldetechnik, Werkund Gerätebau, 1930, page 127, pages 135, 157, and 185." (Journal of Communication Art, Tool and Apparatus Construction). If the rotating plate condensers in the separate wave-band section possess a maximum capacity C max. and if the latter modifies the fundamental frequency of the wave-band filter up to a maximum value ($\omega_0$) max., the self-induction $L_1$ possesses further, in accordance with the invention, at a given width of resonance, a value, which accurately or approximately equals:

(2) $\qquad L_1=\dfrac{1}{[(\omega_0)_{max.}^2+(\omega_0)_{max.}\cdot\Delta\omega]\cdot C_{max.}}.$ Furthermore, in accordance with the invention, the coupling inductance ($L_{12}$) in wave-band filters for the purpose of attaining a constant width of resonance in conjunction with variable tuning or syntonization, has been designed as of the variometer type, so that the self-induction value ($L_{12}$) is uniformly variable in a simple manner.

Furthermore, in accordance with the invention the spindle of this variometer has been so coupled with the spindle of the rotating plate condenser (C) of the separate sections of the wave-band filter, that when varying the fundamental frequency owing to a shift of the condensers, the self-induction value of the variometer is so changed, that the width of resonance ($\Delta\omega$) of the wave-band filter remains constant. This is attained in accordance with the invention preferably by disposing the rotating plate condensers (C) and the variometers ($L_{12}$) upon a common spindle and by causing the condenser plates to be so curved at the edge, that when varying the capacity a constant width of resonance of the wave-band filter is attained with all fundamental frequencies by the variation of the self-induction of the variometer simultaneously taking place positively.

Referring to the values of the maximum and minimum coupling inductions as ($L_{12}$) max. and ($L_{12}$) min., to the maximum and minimum values of the capacities of the rotating plate condensers as C max. and C min., according to the invention the self-induction ($L_a$) of the outer coil of the variometer, the self-induction ($L_i$) of the inner coil of the variometer and the counter inductivity ($L_m$) of both coils have values, which may be accurately or approximately computed with the aid of the following equations:

(3) $\quad 2L_0 = L_a + L_i = \frac{1}{2}\cdot[(L_{12})_{max.} + (L_{12})_{min.}]; \quad 2L_m = \frac{1}{2}\cdot[(L_{12})_{max.} - (L_{12})_{min.}].$ The dimensions and number of turns of the variometer coils required for this purpose may easily be ascertained by known theoretical calculations.

The coupling variometer unequivocally determined upon in this manner, has now further in accordance with the present invention preferably a common spindle with the rotating plate condensers (C) of the wave-band filter and the plates of the condensers are made to show preferably an edge curve, accurately or approximately such as may be computed with the aid of the undermentioned equation:

(4) $\quad \rho = \genfrac{}{}{0pt}{}{4}{\text{or}}_1 \left\{ C_0 \cdot L_m \cdot \left[ 2 \cdot \frac{L_o}{L_m} \cdot \sin\phi - \sin 2\phi \right]^{\frac{1}{2}} \cdot K_0 \right.$ in which the factor $K_0$, generally speaking, differs only slightly from unity in numeral value, satisfying the following equation:

$K_0 = 1 - \frac{9}{4}\left(\frac{\tau_2}{\tau_1^2}\cdot\frac{L_{12}}{L_1}\right) + \frac{171}{16}\left(\frac{\tau_2}{\tau_1^2}\cdot\frac{L_{12}}{L_1}\right)^2 - \frac{989}{32}\left(\frac{\tau_2}{\tau_1^2}\cdot\frac{L_{12}}{L_1}\right)^3 + \frac{34389}{128}\left(\frac{\tau_2}{\tau_1^2}\cdot\frac{L_{12}}{L_1}\right)^4 + \cdots$ In these equations $\rho$ is the radius vector of the separate points of the edge curves and $\phi$ is the proper angle of slope with respect to the zero axis of the coordinate system. Further $C_0 = \left[\frac{2\pi}{\epsilon}\cdot\frac{1}{\tau_1^2}\cdot\frac{d_C}{n_C-1}\cdot\frac{1}{\Delta^2\omega\cdot L_1^3}\right]^{\frac{1}{2}};$ $\epsilon$ = dielectric constant of the condenser dielectric; $d_C$ = distance between plates, $n_C$ = number of plates of the separate rotating plate condensers and $\frac{L_{12}}{L_1} = \frac{2}{\frac{1}{2}}\left|\frac{L_m}{L_1}\cdot\left(\frac{L_0}{L_m} - \cos\phi\right)\right.$ In these equations the factor 2 or ½ is to be placed upon the right side, depending upon whether the variometer coils are connected in series or in parallel.

*Example of performance.*—As an example of performance, the values of the separate defining magnitudes for a wave-band filter of 2 sections in accordance with the present invention may be given, the constant width of resonance of which (band width) measures: $\Delta\omega = 3\pi\cdot 10^4$ Hertz, whose rotating plate condensers are variable between the smallest capacity value C min.=50 cm. and the greatest capacity value C max.=500 cm., while the corresponding range of the fundamental frequency $\omega_0$ extends from $\pi\cdot 10^6$ Hertz up to $\omega_0 = 10^7$ Hertz, corresponding to a wavelength range of from 188 m. up to 600 m. The constant self-induction $L_1$ has a value $L_1 = 1.769\cdot 10^5$ cm.; this may be represented, for instance, by a honeycomb coil or a cylinder coil of the undermentioned dimensions: Inner diameter of coil 5.0 cm., axial length 2.5 cm.; thickness of each separate wire turn: .08 cm.; number of turns per layer 15 turns; total number of turns: 57.6.

The maximum value of the self-induction of the coupling variometer amounts to:

$(L_{12})_{max.} = 5.50\cdot 10^3$ cm.;

its minimum value is: $(L_{12})_{min.} = 1.68_6\cdot 10^3$ cm. The sum of the two self-induction values of the outer and the inner variometer coils amounts to: The counter inductivity of both coils, which is: $2L_m = 1.908\cdot 10^3$ cm. These inductivities may e. g. be represented by variometer coils of the following dimensions:

(1) *Inner coil.*—Mean diameter 4.58 cm., axial length 1.30 cm., number of turns 5.34 turns.

Figure 1:
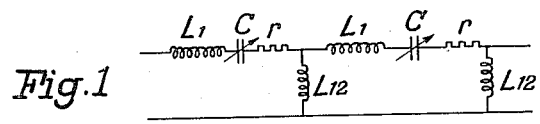
Figure 2:
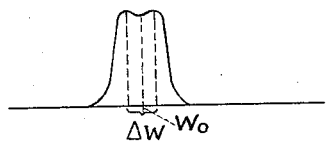
Fig. 2 represents the general course of a resonance curve of a two-section filter with two resonance maxima in a distance $\Delta\omega$.
Figure 3:
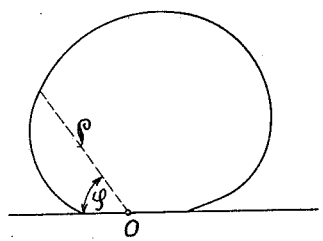
Fig. 3 shows the shape of the edge curve of the condenser plates for the capacity of a filter chain with constant resonance width according to the invention.

(2) *Outer coil.*—Mean diameter 5.83 cm.; axial length 1.30 cm.; number of turns: 4.50 turns. The diameter of each turn of wire amounts in both cases to 0.08 cm. This variometer is disposed with the rotating plate condenser upon a common spindle therewith. The rotating plate condensers are equipped with 21 plates each, the inter-distance between the plates amounting to 0.05 cm. The separate plates possess an edge curve determined by the undermentioned equation:

$\rho = 2.030\cdot\sqrt{3.767\cdot\sin\phi - \sin 2\phi}\cdot K_0;$ $K_0 = 7 - 2.408\cdot 10^{-2}\cdot(1.884 - \cos\phi) +$
$\qquad 1.222\cdot 10^{-3}\cdot(1.884 - \cos\phi)^2 -$
$3.78_2\cdot 10^{-5}\cdot(1.884-\cos\phi)^3 + 3.52\cdot 10^{-6}\cdot(1.884-\cos\phi)^4$ Fig. 3 illustrates the form of this edge curve. The schedule below contains the corresponding values of a number of separate edge curve points.

*Schedule*

| $\phi°$ | cm. $\rho$ | $\phi°$ | cm. $\rho$ | $\phi°$ | cm. $\rho$ | $\phi°$ | cm. $\rho$ |
|---|---|---|---|---|---|---|---|
| 0 | 0 | 45 | 2.55₃ | 90 | 3.78 | 135 | 3.67₅ |
| 5° | .781₅ | 50 | 2.72₅ | 95 | 3.83 | 140 | 3.54₀ |
| 10° | 1.11₂ | 55 | 2.88₇ | 100 | 3.91₀ | 145 | 3.37₇ |
| 15° | 1.37₀ | 60 | 3.04₃ | 105 | 3.93₈ | 150 | 3.17₃ |
| 20° | 1.59₂ | 65 | 3.19₈ | 110 | 3.96₀ | 155 | 2.93₈ |
| 25° | 1.80₈ | 70 | 3.34₀ | 115 | 3.95₃ | 160 | 2.66₀ |
| 30° | 2.00₀ | 75 | 3.47₃ | 120 | 3.92₀ | 165 | 2.32₂ |
| 35° | 2.19₃ | 80 | 3.58₅ | 125 | 3.86₀ | 170 | 1.89₇ |
| 40° | 2.37₅ | 85 | 3.69₅ | 130 | 3.78₀ | 175 | 1.35₀ |
| | | | | | | 180 | 0 |

It is also generally possible to so couple resonant circuits having different self-induction, capacity and loss resistances and not forming a closed, but an open oscillatory circuit, that a definite constant width of the resonance maxima and a wave-band filter effect are secured. For broadcasting purposes such a wave-band filter connection is of particular importance for the coupling of the aerial of the self-induction $L_A$, the capacity $C_A$ and of the loss resistance $r_A$ with one of several closed resonant circuits with the self-induction $L_1$, the capacity $C_1$ and the loss resistance $r_1$, as they are usually connected, for instance in conjunction with the ordinary receiving circuits between grid and cathode of the first electron tube. The present invention now relates to the object, in conjunction with such oscillatory circuits, of rendering the coupling variable in dependence on the variable capacities ($C$ and $C_1$) of the separate filter sections, so that for all resonance syntonization ($\omega_0$) the width of resonance ($\Delta\omega$) of the wave-band filter remains constant. Fig. 4 represents an example of connection of a wave-band filter in accordance with the present invention.

An object of the present invention is, therefore, a wave-band filter, particularly of constant width of resonance for purposes of wireless telephony having the characteristic that a preferably open oscillatory circuit with the self-induction $L_2$, the capacity $C_2$ and the ohmic (loss) resistance $r_2$, e. g. the aerial circuit, is so variably connected or coupled with one or several closed oscillatory circuits with the self-induction $L_1$, the capacity $C_1$ and the ohmic (loss-) resistance $r_1$, preferably with the grid circuit of an amplifier valve or tube, that the width of resonance ($\Delta\omega$) remains constant with all resonance frequencies ($\omega_0$) of a given range. The coupling induction $L_{12}$ of the sections of the wave-band filter in dependence on said electric defining magnitudes of the wave-band filter is generally given by the equation:

$$(1) \quad L_{12} = \left[ r_1 \left(1 - \frac{3}{2}\frac{b}{a^2}\right) \cdot \left(1 + \frac{\tau}{2}\sqrt{-\frac{c}{a^3}}\right) \cdot \sqrt{-\frac{c}{a} - \frac{1}{2}\frac{b}{a}} \right] \cdot L_1$$

(vide Zeitschrift für Fernmeldetechnik Jahrg. 11. 1930, page 636) (Journal of Communication Art), whereby:

$$(2) \quad \tau^2 = \left(1 + \frac{9}{2}\frac{b}{a^2}\right) \cdot \left(1 - \frac{1}{4}\frac{b^2}{a \cdot c}\right); \quad a = -\left[\frac{1}{L_1 C_1 \Delta^2 \omega} + p_L - 2\right]; \quad b = 1 + 2p_L + \frac{e_2}{2}\left(\frac{V_1}{L_1 \cdot \Delta\omega}\right)^2;$$

$$e_2 = 1 + \left(\frac{r_2}{r_1}\right)^2 \cdot p_C; \quad p_L = \frac{L_2}{L_1}; \quad c = p_L + \frac{\epsilon_1}{2}\left(\frac{r_1}{L_1 \Delta\omega}\right)^2; \quad \epsilon_1 = p_L + \left(\frac{r_1}{r_2}\right)^2 \cdot p_C; \quad p_C = \frac{C_2}{C_1};$$

The self-induction value $L_2$ of the open (aerial) oscillatory circuit is formed from the natural self-induction ($L_A$) of the aerial and the preferably variable additional self-induction ($L_z$):

$$L_2 = L_A + L_z;$$

while the capacity $C_2$ is composed of the natural capacity $C_A$, the preferably variable and generally small additional capacity ($C_z$) and the capacity value $C$ of a tunable rotating plate condenser. Among these three magnitudes there exists in a known manner the relation:

$$(3) \quad C_2 = \frac{(C_A + C_z) \cdot C}{C_A + C_z + C}$$

in connection with which in a special case naturally $C_z$ may equal 0. For the purpose of abbrevation we denote the value $C_A + C_z$ by $C_S$:

$$C_s = C_A + C_z; \quad C_2 = \frac{C_s \cdot C}{C_s + C}; \quad C_2 < C_s; \quad C_2 < C.$$

For practical work, however, the maximum capacity ($C_{max}$) of the rotating plate condenser $C$ is suitably of the same order of magnitude, but greater than the maximum capacity ($C_1$)$_{max}$ of the rotating plate condenser $C_1$. In view of the fact, that the natural capacity $C_A$ of the usual aerials is generally substantially smaller than this maximum capacity, it follows that the self-induction $L_2$ of the aerial circuit is generally greater than the value of the of $L_1$: $L_2 > L_1$; $L_2 > L_1$, on the other hand: $C_2 > C_1$.

In a known manner the relation:

$$(4) \quad (L_2 + L_{12}) \cdot C_2 = (L_1 + L_{12}) \cdot C_1 = \frac{1}{\omega_0^2}; \quad \omega_0 = 2\pi r_0$$

= natural frequency of the sections of the wave-band filter.

Therefore in a corresponding manner:

$$L_1 \cdot C_1 = \frac{1}{\omega_1^2}; \quad L_2 \cdot C_2 = \frac{1}{\omega_2^2}; \quad \Delta\omega << \omega_1; \omega_2; \omega_0.$$

From Equation (4) it readily follows that:

$$p_C = \frac{C_2}{C_1} = \frac{1 + \frac{L_{12}}{L_1}}{p_L + \frac{L_{12}}{L_1}} \cong \frac{1}{p_L} = p_r = \frac{L_1}{L_2}.$$

In view of the fact, that in the cases, important from a practical point of view, wherein $L_{12} << L_1$, there results the equation:

$P_C = P_r$ with sufficient approximation. A suitable transformation of the Equation (2) yields:

$$-a = \left(\frac{\omega_1}{\Delta\omega}\right)^2 + p_L - 2; \quad b = 1 + 2p_L + \frac{1}{2}\frac{r_1^2 + p_C r_2^2}{L_1^2 \cdot \Delta^2 \omega};$$

$$c = p_L + \frac{1}{2}\frac{p_L r_1^2 + p_C r_2^2}{L_1^2 \cdot \Delta^2 \omega}$$

For the purpose of abbreviating the writing of these expressions the following designations are introduced:

$$(5) \quad \left(\frac{\Delta\omega}{\omega_1}\right) = s << 1; \quad \frac{1}{\Delta\omega \cdot L_1} \cdot \sqrt{\frac{r_1^2 + p_C \cdot r_2^2}{2}} = R_b;$$

$$\frac{1}{\Delta\omega \cdot L_1} \cdot \sqrt{\frac{p_L r_1^2 + p_b r_2^2}{2}} = R_c$$

In connection therewith $r_1 << r_2$ generally so that, with sufficient approximation:

$$R_b = R_c = \frac{1}{\Delta\omega \cdot L_1} \cdot \frac{r_2}{\sqrt{2p_L}} = R$$

With these designations the equations (2$^x$) will assume the following simple form:

$$(2^{xx}) \quad -a = \frac{1}{s^2} + p_L - 2; \quad b = 1 + 2p_L + R_b^2; \quad c = p_L + R_c^2.$$

The Equation (1) may now be expressed in the following simplified form:

$$(1^x) \quad L_{12} = \left(\tau_0 \cdot \sqrt{-\frac{c}{a}} - \frac{1}{2}\frac{b}{a}\right) \cdot L_1;$$

$$\tau_0 = 1 + \frac{3}{4}\frac{b}{a^2} - \frac{1}{8}\frac{b^2}{a \cdot c} + \frac{1}{2}\sqrt{-\frac{c}{a^3}}.$$

From Equation (2ˣˣ) it follows:

$$\frac{b}{a^2}=\frac{1+2p_L+R_b^2}{(1+(p_L-2)\cdot s^2)^2}\cdot s^4=b_0\cdot a_0^4\cdot s^4;\quad -\frac{b}{a\cdot c}=\frac{1+2p_L+R_b^2}{[1+(p_L-2)\cdot s^2]\cdot(p_L+R_c^2)}\cdot s^2=\frac{b_0\cdot a_0^2\cdot s^2}{c_0^3};$$

$$\sqrt{-\frac{c}{a^3}}=\frac{\sqrt{p_L+R_c^2}}{[1+(p_L-2)\cdot s^2]^{\frac{3}{2}}}\cdot s^3=c_0\cdot a_0^3\cdot s^3;\quad \sqrt{-\frac{c}{a}}=\frac{\sqrt{p_L+R_c^2}}{\sqrt{1+(p_L-2)\cdot s^2}}\cdot s=c_0\cdot a_0\cdot s;\quad -\frac{b}{a}=\frac{1+2p_L+R_b^2}{1+(p_L-2)\cdot s^2}\cdot s^2=b_0\cdot a_0^2\cdot s^2.$$

$$a_0=1-\frac{p_L-2}{2}\cdot s^2;$$
$$b_0=1+2p_L+R_b^2;$$
$$c_0=\sqrt{p_L+R_c^2}.$$

Thus the following result is obtained:

(6) $\tau_0=1+\frac{1}{8}\left(\frac{b_0\cdot a_0}{c_0}\right)^2\cdot s^2+\frac{1}{2}\cdot c_0\cdot a_0^3\cdot s^3+\frac{3}{4}b_0\cdot a_0^4\cdot s^4;\ \tau_1=\tau_0\cdot c_0\cdot a_0;\ \tau_2=\frac{1}{2}b_0\cdot a_0^2.$ Generally a small magnitude $s$ is obtained therefrom, so that it may be stated with close approximation that:

$$\tau_0=1;\ a_0=1;\ \tau_1=c_0;\ \tau_2=\frac{b_0}{2}=p_L+\frac{1+R^2}{2}.$$

The Equation (1ˣ) for the coupling induction $L_{12}$ thus definitely assumes the following form:

(1ˣˣ) $\quad L_{12}=\tau_1\cdot\Delta\omega\cdot L_1^{\frac{3}{2}}\sqrt{C_1}+\tau_2\cdot\Delta^2\omega\cdot L_1^2\cdot C_1$ in which the magnitudes $\tau_1$ and $\tau_2$ are determined by the Equation (6).

In accordance with the present invention the coupling induction $L_{12}$ of the wave-band filter is given a value, which in dependence on the capacity ($C_1$) of the rotating plate condenser ($C_1$) of the closed oscillatory circuits is accurately or approximately given by the Equation (1ˣˣ).

The coupling induction has further in accordance with the present invention been designed as a variometer. This variometer is so coupled mechanically with the spindle of the rotating plate condenser $C_1$, preferably by means of a common spindle, that the width of resonance ($\Delta\omega$) of the wave-band filter remains constant with all frequencies ($\omega_0$) of a given range.

In order to attain this, the plates of the rotating plate condenser $C_1$ are, in accordance with the present invention, so shaped, that their edge curves are accurately or approximately given by the equation:

(7) $\rho_1=\frac{4}{1}\left(\frac{k_1}{2k_L^2}\right)^{\frac{1}{2}}\cdot L_m\cdot\left[2\cdot\frac{L_o}{L_m}\cdot\sin\phi-\sin 2\phi\right]^{\frac{1}{2}}\cdot K_1$ (vide Equation 4). Therein $\rho_1\phi_1$ mean the polar coordinates of the edge curve points (of $C_1$) with the rotating spindle as zero. Further:

$k_1=\frac{4\pi}{\epsilon}\cdot\frac{d_1}{n_1-1};\ k_L=\tau_1\cdot\Delta\omega L_1^3;\ k_\Delta=\tau_2\cdot\Delta^2\omega\cdot L_1^2;\ \frac{2\tau_2}{\tau_1^2}=\alpha;\ \frac{k_1}{2k_L^2}=\frac{2\pi}{\epsilon}\cdot\frac{1}{\tau_1^2}\cdot\frac{d_1}{n_1-1}\cdot\frac{1}{\Delta^2\omega\cdot L_1^3};\ \frac{L_{12}}{L_1}=$ $2\left|\frac{L_m}{L_1}\cdot\left(\frac{L_o}{L_m}-\cos\phi\right)=y_1;\ K_1^2=1-\frac{3}{2}\alpha y_1+\frac{5}{2}\alpha^2 y_1^2-\frac{35}{8}\alpha^3 y_1^3+\frac{63}{8}\alpha^4 y_1^4-\ldots\right.$ wherein is $d_1$=distance and $n_1$=number of the condenser plates, $\epsilon$=dielectric constant, $L_m=\frac{1}{4}[(L_{12})_{max.}-(L_{12}_{min.})]$=counter induction of the two variometer coils, $$L_o=\frac{1}{2}(L_a+L_i)=\frac{1}{4}\cdot[(L_{12})_{max.}+(L_{12})_{min.}]$$

$L_a$=self-induction of the outer variometer coil,
$L_i$=self-induction of the inner variometer coil.

In accordance with a further idea embodied in the present invention, the rotating plate condenser $C$ of the open (aerial) oscillatory circuit is also mechanically coupled with the rotating plate condenser $C_1$ of the closed sections of the wave-band filter and the coupling variometer $L_{12}$ by means of a common spindle. The edge curve of the condenser $\rho_2^1\psi$ required for the purpose of attaining a constant width of resonance ($\Delta\omega$) is ascertained in the following manner: The capacity value $C$ must suffice according to Formula (3) of the Equation (3ˣ):

(3ˣ) $\quad C=\frac{C_2\cdot C_s}{C_s-C_2};$ in which according to Equation (4):

$$C_2=\frac{1+y_1}{p_L+y_1}\cdot C_1$$

After a few transformations it may be deduced therefrom that:

$$\frac{1}{2k_2}\cdot\rho_2^2=\frac{dC}{d\phi}=\frac{(p_L+y_1)(1+y_1)\cdot\frac{dC}{d\phi}1+(p_L-1)\cdot b_1\cdot\frac{dy_1}{d\phi}}{[(p_L+y_1)\cdot C_s-(1+y_1)\cdot C_1]^2}\cdot C_s^2$$

Therein $$y_1=\frac{L_{12}}{L_1}=2\cdot\frac{L_m}{L_1}\cdot\left(\frac{L_o}{L_m}-\cos\phi\right);\ \frac{dy_1}{d\phi}=2\cdot\frac{L_m}{L_1}\cdot\sin\phi.$$

The Equation (1ˣˣ) yields:

$$C_1=\frac{L_1}{k_\Delta}\cdot\left|y_1+\frac{k_L^2}{2k_\Delta\cdot L_1}-\sqrt{\left(\frac{k_L^2}{2k_\Delta L_1}\right)^2+\frac{k_L^2}{k_\Delta L_1}\cdot y_1}\right|;$$

$$k_\Delta=\tau_2\cdot\Delta^2\omega\cdot L_1^2;\ \frac{k_L^2}{2k_\Delta\cdot L_1}=\frac{\tau_1^2}{2\tau_2}=\frac{1}{\alpha};\ k_2=\frac{4\pi}{\epsilon}\cdot\frac{d_2}{n_2-1};$$

$$\frac{db_1}{d\phi}=\frac{L_1}{k_\Delta}\cdot\left[1-\frac{1}{\sqrt{1+\frac{4k_\Delta L_1}{k_L^2}\cdot y_1}}\right]\cdot\frac{dy_1}{d\phi};\ y_2=\frac{L_{12}}{L_2}=p_r\cdot y_1;$$

$$L_2\cdot C_s\cdot\Delta^2\omega=\left(\frac{\Delta\omega}{\omega_s}\right)^2=s_s^2;$$

so that finally:

(8) $\rho_2=2\cdot\sqrt{\tau_2\cdot k_2\cdot L_m}\cdot C_s\cdot\Delta\omega^4\dfrac{\left\{(1+y_2)^2-(1-p_r)\left(1-\dfrac{p_r}{\alpha}\right)(\sqrt{1+2\alpha y_1}-1)-(1-p_r)\cdot y_2\right\}^{\frac{1}{2}}\cdot\sqrt{\sin\phi}}{\sqrt{1+2\alpha y_1}\cdot\left\{\tau_2\cdot p_r\cdot(1+y_2)\cdot s_s^2-(1+y_1)\left(y_2+\dfrac{p_r}{\alpha}\sqrt{1+2\alpha y_1}-1\right)\right\}}$ in which:

$$\alpha=\frac{2\tau_2}{\tau_1^2}=\frac{1}{\tau_0^2}\cdot\frac{b_0}{c_0 z}\sim\frac{1}{\tau_0^2}\left(1+\frac{1+p_r}{1+p_r R^2}\right);$$

$$R=\frac{r_2}{\sqrt{2L_1L_2}}\cdot\frac{1}{\Delta\omega};\ r_1\ll r_2;$$

$$\tau_2=\frac{1}{2}b_0\cdot a_0^2\sim p_L+\frac{1+R^2}{2};\ k_2=\frac{4\pi}{\epsilon}\cdot\frac{d_2}{n_2-1};$$

$d_3$, $n_2$ equals distance or number of plates of the rotating plate condenser $C$.

In special cases, of course, the self-induction of all sections of wave-band filters may be selected of the same magnitude: $L_1$ equals $L_2$ equals $L$. It follows that: $C_1$ will then equal $C_2$, $p_L = p_r = 1$, $y_1 = y_2 = y$. Under this supposition the above-mentioned equation for $\rho_2$ will be simplified in the following manner:

$$(8^x) \quad \rho_2 = 2 \cdot \sqrt{\tau_2 k_2 L_m} \cdot C_s \cdot \Delta\omega \left( \frac{\sqrt{1+2\alpha y_1}-1}{\sqrt{1+2\alpha y_1}} \right)^{\frac{1}{2}} \cdot \frac{\sqrt{\sin \phi}}{\tau_2 s_s^2 - y + \frac{1}{2}[\sqrt{1+2\alpha y_1}-1]}.$$

In accordance with the present invention, the rotating plate condenser C in the open (aerial) oscillatory circuit is fitted with plates of such shape, that their edge curve is determined, either accurately or approximately by the Equation (8).

In view of the fact that in cases most important for practical work generally $$Y_i = \frac{L_{12}}{L_i} = \frac{L_{12}}{L_i}; \quad (i=1.2)$$

is small compared with the unit, the Equations (8) and (8$^x$) may be simplified for practical work. This is all the more admissible as the tuning or syntonization of the aerial does not, as experience has shown, require great accuracy. By expressing the radical expressions as mathematical series, corresponding condensation or collection of the terms and neglecting all the powers exceeding the second power, the following result will be obtained:

$$(9) \quad \rho_2 = 4 \cdot \sqrt{\frac{2\pi}{\epsilon \cdot \tau_1^2} \cdot \frac{d_2}{n_2-1} \cdot \frac{1}{L_2} \cdot \frac{1}{\Delta\omega} \cdot \frac{L_m}{L_1} \left[ \frac{2L_0}{L_m} \cdot \sin\phi - \sin 2\phi \right]^{\frac{1}{2}}} \cdot K_2, \quad K_2 = \frac{1+\frac{1}{2}(p_r-\alpha+3)y_1+[(p_r-\alpha)\cdot y_1^2]^{\frac{1}{2}}}{\left(1+\frac{1}{2}\alpha y_1-\frac{3}{8}\alpha^2 y_1^2\right) \cdot \left[1+p_r y_1 - \frac{1}{\tau_1^2 s_s^2}y_1^2\right]}$$

$$\frac{1}{\tau_1^2 s_s^2} = \frac{p_r}{\tau_0^2} \cdot \frac{L_2}{C_s} \cdot \frac{1}{\frac{1}{2}r_2^2 + L_2^2 \cdot \Delta^2\omega}; \quad p_r = \frac{L_1}{L_2}; \quad p_r - \alpha = p_r - \frac{b_0}{\tau_0^2 C_0^2} = p_r - \frac{1}{\tau_0^2}\left(1+\frac{1+p_L}{p_L+R^2}\right); \quad R^2 = \frac{1}{2}\frac{r_2^2}{L_1 L_2 \cdot \Delta^2\omega}.$$

Considering that the value for $\rho_2$ and thus also for the shape of the plates of the rotating plate condenser in the open (aerial) oscillatory circuit is rather considerably dependent on the total self-induction value $L_2$, the capacity $C_2$ and the ohmic (loss) resistance $r_2$ of the aerial, in accordance with a further idea embodied in the present invention, a generally small, regulable additional capacity $C_2$, placed in parallel or in series to the self-induction ($L_z$ and $L_{12}$) and to the capacity $C_1$ and a regulable ohmic resistance, have been interpolated in the aerial circuit. Furthermore, the self-induction $L_z$ of the aerial circuit is variable within a generally small range. This will render it possible to adapt to different aerial circuits a wave-band filter in accordance with the present invention. The variation of the self-induction $L_z$ is most suitably attained in connection herewith by splitting up the coil $L_z$ into a larger and a smaller adjustable or rotatable part. By variation of the counter inductivity of both parts of the coil, it will be possible in a known manner to adjust the self-induction of the coil $L_z$ to the required value. This is suitably effected in, that after connecting the wave-band filter with the aerial and with the receiving set a transmitting station of relatively short wave-length is first tuned in, in the lower part of the wave-range of the wave-band filter and the self-induction $L_z$ in the aerial circuit so adjusted, that the greatest possible volume of sound is secured. Subsequently a sending station of relatively long wave-length in the upper part of the wave-range of the wave-band filter is tuned in and the additional capacity $C_2$ in the aerial circuit so regulated, that again the greatest possible volume of sound is secured. A finer balancing of the wave-band filter with the aerial may also be attained by correspondingly regulating the ohmic additional resistance by tuning in different sending stations. After the balancing has been effected in this manner, these additional magnitudes remain constant.

On the other hand, however, the attenuation resistance of the open (aerial) oscillatory circuit may be varied by back-coupling to any desired values. In conjunction with the wave-band filter care should be taken in this case, that the value $r_2$ of the loss resistance of the aerial circuit is no longer great when compared with the value $r_1$ of the loss resistance in the other sections of the wave-band filter.

A wave-band filter in accordance with the present invention may also be successfully employed for coupling the high frequency amplifying tubes. In this case the special measures which served to adapt the wave-band filter to various aerial circuits, may naturally be omitted. In connection herewith it is advisable to use electron tubes having the highest possible internal resistance, particularly screen grid tubes.

Having now particularly described and ascertained the nature of my said invention, I declare that what I claim is:

1. A chain of electric filter circuits or wave-band filter, particularly of constant width of resonance ($\Delta\omega$) for purposes of wireless telephony, comprising a plurality of members, each member being an elementary oscillating circuit formed of self-induction and capacity, and inductively coupled with each other, the self-induction value ($L_{12}$) of the coupling induction of the separate members of the wave-band filter substantially answering to the equation $$L_{12} = \tau_1 \cdot \Delta\omega \cdot L_1^{\frac{3}{2}} \cdot \sqrt{C} + \frac{3}{2} \cdot \tau_2 \Delta^2\omega \cdot L_1^2 \cdot C$$

wherein $L_1$ is the constant self-induction, $C$ the variable capacity of the separate sections of the wave-band filter and $\tau_1$ and $\tau_2$ are determined by the following equation:

$$\tau_1 = 1 + \frac{1}{2}R + \ldots + \frac{21}{8}S \cdot \left(1 + \frac{5}{14}R + \ldots\right) + \frac{1}{2}S^{\frac{3}{2}} \cdot (1+R) + \ldots$$

$$\tau_2 = 1 + \frac{1}{3}R + 3s \cdot \left[1 + \frac{1}{3}R\right]; \quad s = \left(\frac{\Delta\omega}{\omega_0}\right)^2; \quad R = \left(\frac{r}{\Delta\omega \cdot L_1}\right)^2$$

and it is: $\omega_0$ = frequency in radians, $r$ = ohmic (loss) resistance of the separate sections of the wave-band filter.

2. A chain of electric filter circuits or wave-band filter in accordance with claim 1, wherein the constant self-induction ($L_1$) of the separate members of the wave-band filter answers substantially to the equation:

$$L_1 = \frac{1}{[(\omega_0)^2{}_{max.} + (\omega_0)_{max.} \cdot \Delta\omega] \cdot C_{max.}};$$

wherein C max is the greatest value of the variable capacity of the separate sections of the wave-band filter.

3. A chain of electric filter circuits or wave-band filter in accordance with claim 1, wherein the coupling induction of the separate members of the wave-band filter comprises a variometer.

4. A chain of electric filter circuits or wave-band filter, particularly of constant width of resonance ($\Delta\omega$) for purposes of wireless telephony, comprising a plurality of members, each member being an elementary oscillating circuit formed of self-induction and capacity, and inductively coupled with each other, the self-induction value ($L_{12}$) of the coupling induction of the separate members of the wave-band filter substantially answering to the equation $$L_{12} = \tau_1 \cdot \Delta\omega \cdot L_1^{\frac{3}{2}} \cdot \sqrt{C} + \frac{3}{2} \cdot \tau_2 \cdot \Delta^2\omega \cdot L_1^2 \cdot C$$

wherein $L_1$ is the constant self-induction, C the variable capacity of the separate sections of the wave-band filter and $\tau_1$ and $\tau_2$ are determined by the following equation:

$$\tau_1 = 1 + \frac{1}{2}R + \ldots + \frac{21}{8}S \cdot \left(1 + \frac{5}{14}R + \ldots \right) - \frac{1}{2}S^{\frac{3}{2}} \cdot (1+R) + \ldots$$

$$\tau_2 = 1 + \frac{1}{3}R + 3s \cdot \left[1 + \frac{1}{3}R\right]; \quad s = \left(\frac{\Delta\omega}{\omega_0}\right)^2; \quad R = \left(\frac{r}{\Delta\omega \cdot L_1}\right)^2$$

and it is $\omega_0$=frequency in radians, $r$=ohmic (loss) resistance of the separate sections of the wave-band filter, said coupling induction of the separate members of the wave-band filter forming a variometer consisting of several coils, the self-induction values ($L_a$ and $L_i$) of the outer and of the inner variometer coils, as well as the counter inductivity ($2 L_m$) of both coils substantially answering to the equations:

$$2L_0 = L_a + L_i = \frac{1}{2} \cdot [(L_{12})_{max.} + (L_{12})_{min.}]$$
$$2L_m = \frac{1}{2} [(L_{12})_{max.} - (L_{12})_{min.}]$$

5. A chain of electric filter circuits or wave-band filter, particularly of constant width of resonance ($\Delta\omega$) for purpose of wireless telephony, comprising a plurality of members, each member being an elementary oscillating circuit formed of self-induction and capacity, and inductively coupled with each other, said capacity being formed by a rotating plate condenser, the self-induction value ($L_{12}$) of the coupling induction of the separate members of the wave-band filter substantially answering to the equation $$L_{12} = \tau_1 \cdot \Delta\omega \cdot L_1^{\frac{3}{2}} \cdot \sqrt{C} + \frac{3}{2} \cdot \tau_2 \cdot \Delta^2\omega \cdot L_1^2 \cdot C$$

wherein $L_1$ is the constant self-induction, C the variable capacity of the separate sections of the wave-band filter and $\tau_1$ and $\tau_2$ are determined by the following equation:

$$\tau_1 = 1 + \frac{1}{2}R + \ldots + \frac{21}{8}S \cdot \left(1 + \frac{5}{14}R + \ldots \right) + \frac{1}{2}S^{\frac{3}{2}} \cdot (1+R) + \ldots$$

$$\tau_2 = 1 + \frac{1}{3}R + 3s \cdot \left[1 + \frac{1}{3}R\right]; \quad s = \left(\frac{\Delta\omega}{\omega_0}\right)^2; \quad R = \left(\frac{r}{\Delta\omega \cdot L_1}\right)^2$$

and it is: $\omega_0$=frequency in radians, $r$=ohmic (loss) resistance of the separate sections of the wave-band filter, said coupling induction of the separate members of the wave-band filter forming a variometer consisting of several coils, said coils being arranged on one and the same axis, said axis being coupled with the axis of said rotating plate condenser of the corresponding chain member.

6. A chain of electric filter circuits or wave-band filter in accordance with claim 5, wherein the variometer and the variable condenser are coupled in such manner that both are moved in accordance with the law defined by the equation given in claim 5 in interdependence.

7. A chain of electric filter circuits or wave-band filter in accordance with claim 5, wherein the coupling variometers and rotating plate condensers are carried by a common spindle.

8. A chain of electric filter circuits or wave-band filter, particularly of constant width of resonance ($\Delta\omega$) for purpose of wireless telephony, comprising a plurality of members, each member being an elementary oscillating circuit formed of self-induction and capacity and inductively coupled with each other, said capacity being formed by a rotating plate condenser, each rotating plate condenser comprising several metal plates arranged above one another, said metal plates being separated from one another by a dielectric, the self-induction value ($L_{12}$) of the coupling induction of the separate members of the wave-band filter substantially answering to the equation $$L_{12} = \tau_1 \cdot \Delta\omega \cdot L_1^{\frac{3}{2}} \cdot \sqrt{C} + \frac{3}{2} \cdot \tau_2 \cdot \Delta^2\omega \cdot L_1^2 \cdot C$$

wherein $L_1$ is the constant self-induction, C the variable capacity of the separate sections of the wave-band filter and $\tau_1$ and $\tau_2$ are determined by the following equation:

$$\tau_1 = 1 + \frac{1}{2}R + \ldots + \frac{21}{8}S \cdot \left(1 + \frac{5}{14}R + \ldots \right) + \frac{1}{2}S^{\frac{3}{2}} \cdot (1+R) + \ldots$$

$$\tau_2 = 1 + \frac{1}{3}R + 3s \cdot \left[1 + \frac{1}{3}R\right]; \quad s = \left(\frac{\Delta\omega}{\omega_0}\right)^2; \quad R = \left(\frac{r}{\Delta\omega \cdot L_1}\right)^2$$

and it is: $\omega_0$=frequency in radians, $r$=ohmic (loss) resistance of the separate sections of the wave-band filter, said coupling induction of the separate members of the wave-band filter forming a variometer consisting of several coils, said coils being arranged on one and the same axis, said axis being coupled with the axis of said rotating plate condenser of the corresponding chain member, said metal plates of said rotating plate condensers possessing such an edge curve, that when varying the fundamental frequency of the wave-band filter the width of resonance ($\Delta\omega$) will constant.

9. A chain of electric filter circuits or wave-band filter in accordance with claim 8, wherein the polar coordinates ($\rho$, $\phi$) of the edge curve points of said plates of said rotating plate condensers substantially answer to the equation:

$$\rho = \begin{matrix} 4 \\ \text{or} \\ 1 \end{matrix} \bigg\} c_0 \cdot L_m \cdot \left(2 \cdot \frac{L_o}{L_m} \cdot \sin\phi - \sin 2\phi\right)^{\frac{1}{2}} \cdot K_0;$$

in which is:

$$c_0 = \left[\frac{2\pi}{\epsilon} \cdot \frac{1}{\tau_1} 2 \cdot \frac{d_C}{n_C - 1} \cdot \frac{1}{\Delta^2 \omega \cdot L_1} 3\right]^{\frac{1}{2}};$$

$$K_0 = 1 - \frac{9}{4}\left(\frac{\tau_2}{\tau_1^2} \cdot \frac{L_{12}}{L_1}\right) + \frac{171}{16}\left(\frac{\tau_2}{\tau_1^2} \cdot \frac{L_{12}}{L_1}\right)^2 - \frac{981}{32} \cdot \left(\frac{\tau_2}{\tau_1^2} \cdot \frac{L_{12}}{L_1}\right)^3 + \ldots$$

$\epsilon$=dielectric constant of the condenser dielectric, $d_C$=distance between plates, $n_C$=number of plates of the separate rotating plate condensers.

10. A chain of electric filter circuits or waveband filter in accordance with claim 8, wherein the constant self-induction ($L_1$) of said members of the wave-band filter, the coupling induction ($L_{12}$) preferably designed as variometer, the sum of the self-inductions ($L_a + L_i$) of said outer and inner variometer coils, the counter induction ($2L_m$) of both said coils, the polar coordinates ($\rho, \phi$) of said edge curve points of said condenser plates, the distance between said plates ($d_C$) and the number of said plates ($n_C$) have the following values:

$L_1 = 1.769 \cdot 10^5$ cm.; $(L_{12})_{max.} = 5.50 \cdot 10^3$ cm.;

$(L_{12})_{min.} = 1.686 \cdot 10^3$ cm.; $L_a + L_i = 3.594 \cdot 10^3$ cm.;

$2L_m = 1.908 \cdot 10^3$ cm.; $\rho = 2.030 \cdot \sqrt{3.767 \cdot \sin\phi - \sin 2\phi} \cdot K_0$ cm.;

$K_0 = 1 - 2.40 \cdot 10^{-2} (1.884 - \cos\phi) + 1.22 \cdot 10^{-3} (1.884 - \cos\phi)^2 - 3.78 \cdot 10^{-5}(1.884 - \cos\phi)^3 + 3.52 \cdot 10^{-6} (1.884 - \cos\phi)^4 + \ldots d_C = 0.05$ cm.; $n_C = 21$.

11. A chain of electric filter circuits or waveband filter, particularly of constant width of resonance ($\Delta\omega$) for purposes of wireless telephony, comprising a plurality of members, each member being an elementary oscillating circuit formed of self-induction and capacity, and inductively coupled with each other, an open oscillatory circuit comprising the self-induction $L_2$, the capacity $C_2$ and the ohmic (loss) resistance $r_2$, being variably coupled with closed oscillatory circuits with the self-induction $L_1$, the capacity $C_1$ and the ohmic resistance $r_1$, in such a way, that the width of resonance (band width) ($\Delta\omega$) remains constant with all resonance frequencies ($\omega_0$) of a given range.

12. A chain of electric filter circuits or waveband filter in accordance with claim 11, with inductive coupling of the single chain members, the coupling induction ($L_{12}$) substantially answering to the equation:

$$L_{12} = \tau_1 \cdot \Delta\omega \cdot L_1^{\frac{3}{2}} \cdot \sqrt{C_1} + \tau_2 \cdot \Delta^2 \omega \cdot L_1^2 \cdot C_1;$$

wherein is:

$$\tau_1 = \tau_0 \cdot c_0 \cdot a_0; \quad \tau_2 = \frac{1}{2} b_0 \cdot a_0^2; \quad a_0 = \frac{1}{\sqrt{1+(p_L-2)s^2}};$$

$$c_0 = \sqrt{p_L + R_c^2}; \quad \tau_0 = 1 + \frac{1}{8}\left(\frac{b_0 a_0}{c_0}\right)^2 \cdot s^2 + \frac{1}{2} \cdot c_0 a_0^3 \cdot s^3 + \frac{3}{4} b_0 \cdot a_0^4 \cdot s^4 + \ldots$$

$$b_0 = 1 + 2p_L + R_b^2; \quad p_L = \frac{L_2}{L_1} = \frac{1}{p_r}; \quad s = \frac{\Delta\omega}{\omega_1} = \Delta\omega \cdot \frac{C}{\sqrt{L_1 \cdot L_1}};$$

$$R_b = \frac{1}{\Delta\omega \cdot L_l} \sqrt{\frac{r_1^2 + p_C \cdot r_2^2}{2}}; \quad R_c = \frac{1}{\Delta\omega \cdot L_1} \sqrt{\frac{p_L r_1^2 + p_C r_2^2}{2}};$$

$$p_C = \frac{C_2}{C_1}.$$

13. A chain of electric filter circuits or waveband filter, particularly of constant width of resonance ($\Delta\omega$) for purpose of wireless telephony, comprising a plurality of members, each member being an elementary oscillating circuit formed of self-induction and capacity, and inductively coupled with each other, said capacity being formed by a rotating plate condenser, an open oscillatory circuit comprising the self-induction $L_2$, the capacity $C_2$ and the ohmic (loss) resistance $r_2$, being variably coupled with closed oscillatory circuits with the self-induction $L_1$, the capacity $C_1$ and the ohmic resistance $r_1$, in such a way, that the width of resonance (band width) ($\Delta\omega$) remains constant with all resonance frequencies ($\omega_0$) of a given range, the coupling induction being made as a variometer.

14. A chain of electric filter circuits or waveband filter according to claim 13, said coupling variometer being mechanically coupled with the rotating plate condensers of the members of the wave-band filter in such way, that both are moved in accordance with the equation given in claim 12 in interdependence.

15. A chain of electric filter circuits or waveband filter according to claim 13, each rotating plate condenser comprising several metal plates arranged above one another, said metal plates being separated from one another by a dielectric, said metal plates of said rotating plate condensers of the closed oscillatory circuits having such an edge curve that the polar coordinates ($\rho_1, \phi$) of said edge curve substantially will answer to the equation:

$$\rho_1 = 4 \cdot \sqrt{\frac{k_1}{2k_L^2}} \cdot L_m \cdot \left[2\frac{L_o}{L_m} \cdot \sin\phi - \sin 2\phi\right]^{\frac{1}{2}} \cdot K_1;$$

wherein is:

$$k_1 = \frac{4\pi}{\epsilon} \cdot \frac{d_1}{n_1 - 1}; \quad k_L = \tau_1 \cdot \Delta\omega \cdot L_1^{\frac{3}{2}}; \quad k\Delta = \tau_2 \cdot \Delta^2 \omega \cdot L_1^2;$$

$$\frac{2\tau_2}{\tau_1} = \alpha; \frac{L_{12}}{L_1} = Y_1 = 2\frac{L_m}{L_1}\left(\frac{L_o}{L_m} - \cos\phi\right);$$

$$K_1^2 = 1 - \frac{3}{2} \cdot \alpha \cdot Y_1 + \frac{5}{2} \cdot \alpha^2 \cdot Y_1^2 - \frac{35}{8} \cdot \alpha^3 Y_1^3 + \frac{63}{8} \alpha^4 Y_1^4 \ldots;$$

$$L_m = 1/4 \cdot [(L_{12})_{max.} - (L_{12})_{min.}] =$$

counter induction of the variometer coils, $$L_o = \frac{1}{2}(L_a + L_i) = 1/4 \cdot [(L_{12})_{max.} + (L_{12})_{min.}],$$

$L_a$=self-induction of the outer variometer coil, $L_i$=self-induction of the inner variometer coil,
$d_1$=distance and $n_1$=number of condenser plates,
$\epsilon$=dielectric constant.

16. A chain of electric filter circuits or waveband filter according to claim 13, each rotating plate condenser comprising several metal plates arranged above one another, said metal plates being separated from one another by a dielectric, said metal plates of said rotating plate condensers of the open (aerial) oscillatory circuit having such an edge curve that the polar coordinates ($\rho_2, \phi$) of said edge curve substantially will answer to the equation:

$$\rho_2 = 4 \cdot \sqrt{\frac{2\pi}{\epsilon \cdot \tau_1^2} \cdot \frac{d_2}{n_2-1} \cdot \frac{1}{L_2} \cdot \frac{1}{\Delta\omega} \cdot \frac{L_m}{L_1} \left[\frac{2L_0}{L_m} \cdot \sin\phi - \sin 2\phi\right]^{\frac{1}{2}}} \cdot K_2;$$

wherein is:

$$K_2 = \frac{[1+\frac{1}{2}(3+p_r-\alpha)\cdot Y_1 + (p_r-\alpha)\cdot Y_1^2]^{\frac{1}{2}}}{\left[1+\frac{1}{2}\alpha\cdot Y_1 - \frac{3}{8}\alpha^2 \cdot Y_1^2\right]\cdot\left[1+p_r\cdot Y_1 - \frac{1}{\tau_1^2 s_s^2}\cdot Y_1^2\right]};$$

$$\frac{1}{\tau_1^2 \cdot s_s^2} = \frac{p_r}{\tau_0^2} \cdot \frac{L_2}{C_s} \cdot \frac{1}{\frac{1}{2}r_2^2 + L_2^2 \cdot \Delta^2\omega};$$

$$p_r - \alpha = p_r - \frac{b_0}{\tau_0^2 \cdot c_0^2} = p_r - \frac{1}{\tau_0^2}\cdot\left(1+\frac{1+p_L}{p_L+R^2}\right); R_2 = \frac{3}{2}\frac{r_2^2}{L_1 \cdot L_2 \cdot \Delta^2\omega};$$

$d_2$ = distance and $n_2$ = number of condenser plates.

17. A chain of electric filter circuits or waveband filter, particularly of constant width of resonance ($\Delta\omega$) for purposes of wireless telephony, comprising a plurality of members, each member being an elementary oscillating circuit formed of self-induction and capacity, and said circuits being inductively coupled with each other, an open oscillatory circuit comprising the self-induction $L_2$, the capacity $C_2$ and the ohmic (loss) resistance $r_2$, being variably coupled by closed oscillatory circuits with the self-induction $L_1$, the capacity $C_1$ and the ohmic resistance $r_1$, in such way, that the width of resonance (band width) ($\Delta\omega$) remains constant at all resonance frequencies ($\omega$) of a given range, said open oscillatory circuit being the aerial circuit and containing, apart from the coupling induction and the tunable capacity, an additional self-induction and an additional capacity.

18. A chain of electric filter circuits or waveband filter according to claim 17, said additional self-induction of said aerial oscillatory circuit being variable in such way, that the wave-band filter may be adapted to the natural self-inductions of the different aerial circuits.

19. A chain of electric filter circuits or waveband filter according to claim 17, said additional capacity of said aerial circuit being variable in such way, that the wave-band filter may be adapted to the natural capacities of the different aerial circuits.

20. A chain of electric filter circuits or waveband filter according to claim 17, a regulable ohmic resistance being situated within the open (aerial) oscillatory circuit, said ohmic resistance serving for adapting the wave-band filter to the loss resistance of different open aerial oscillatory circuits.

21. A chain of electric filter circuits or waveband filter in accordance with claim 5, said axis of said variometers of all chain members being coupled with said axis of all rotating plate condensers.

22. A chain of electric filter circuits or waveband filter in accordance with claim 11, said open oscillatory circuit being the aerial circuit.

23. A chain of electric filter circuits or waveband filter in accordance with claim 11, one of said closed oscillatory circuits being the grid circuit of an electron tube.

24. A chain of electric filter circuits or waveband filter in accordance with claim 13, said coupling variometer being mechanically coupled with the rotating plate condensers of members of the wave-band filter by means of a common axis in such a way, that the width of resonance ($\Delta\omega$) will remain constant for all resonance frequencies of a given range.

GUSTAV SCHWEIKERT.